Figure 1:
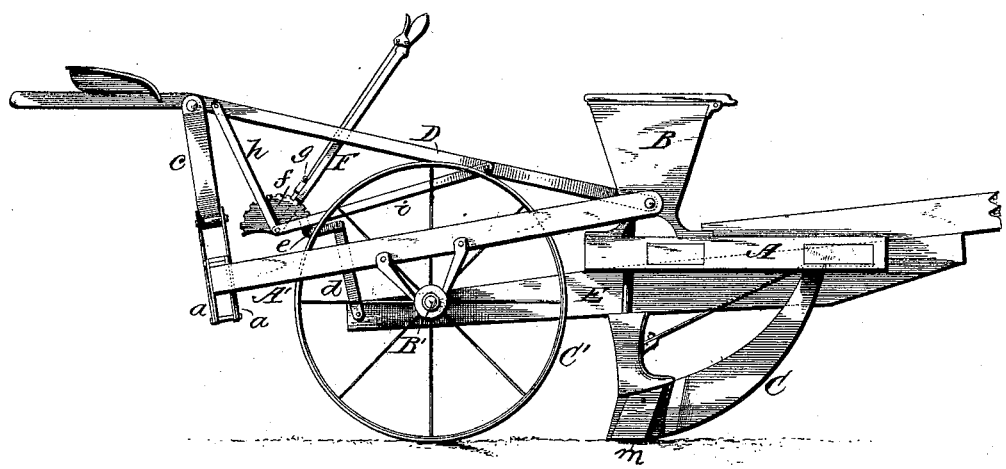

(No Model.) 2 Sheets—Sheet 1.

J. W. RHODES.
GRAIN DRILL.

No. 400,947. Patented Apr. 9, 1889.

Witnesses
Chas. J. Williamson.
E. H. Bond.

Inventor
John W. Rhodes.
per
Chas. N. Fowler
Attorney.

N. PETERS, Photo-Lithographer, Washington, D. C.

(No Model.) 2 Sheets—Sheet 2.
J. W. RHODES.
GRAIN DRILL.
No. 400,947. Patented Apr. 9, 1889.
Fig. 3.
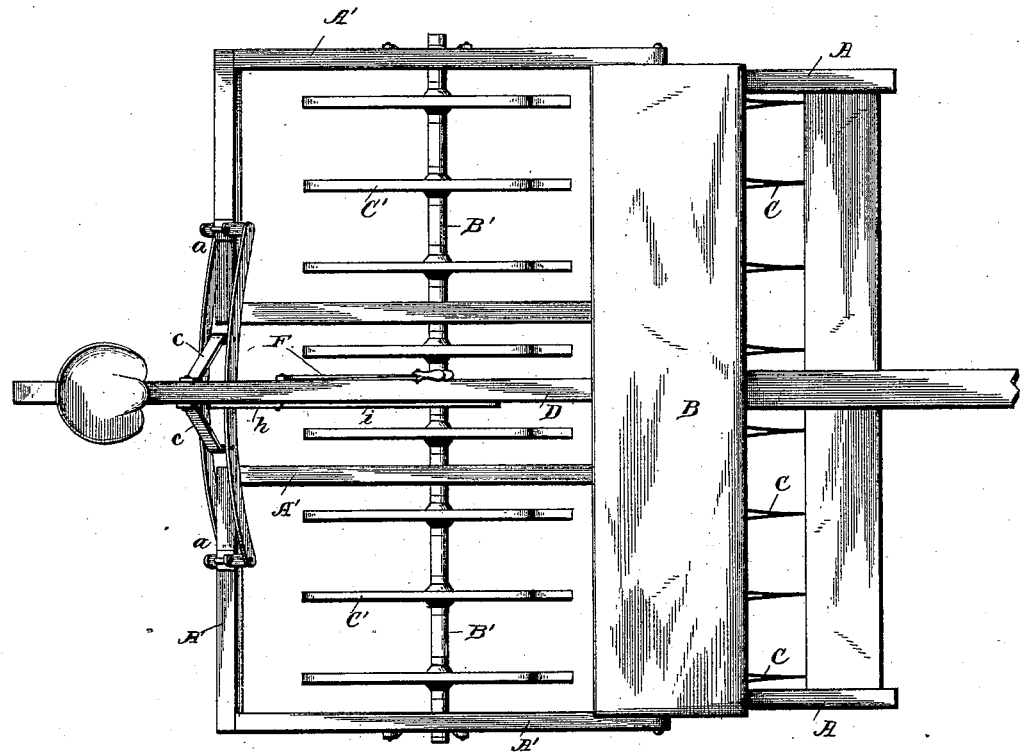
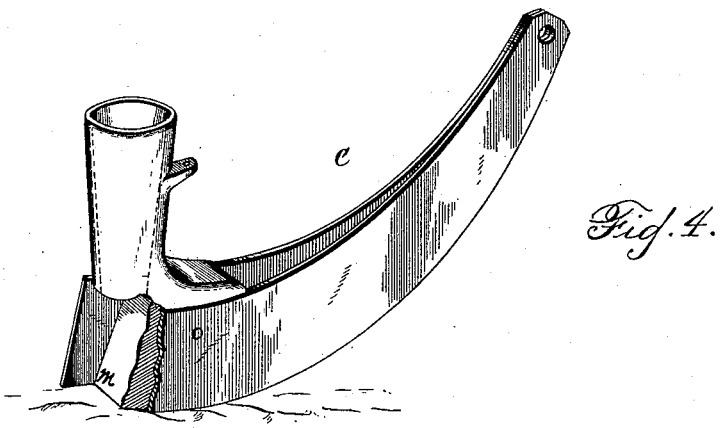
Fig. 4.
Witnesses.
Albert Speiden
E. H. Bond
Inventor.
John W. Rhodes.
By his Attorney
Chas. H. Fowler

UNITED STATES PATENT OFFICE.

JOHN W. RHODES, OF HAVANA, ILLINOIS.

GRAIN-DRILL.

SPECIFICATION forming part of Letters Patent No. 400,947, dated April 9, 1889.

Application filed October 9, 1888. Serial No. 287,686. (No model.)

*To all whom it may concern:*

Be it known that I, JOHN W. RHODES, a citizen of the United States, residing at Havana, in the county of Mason and State of Illinois, have invented certain new and useful Improvements in Grain-Drills; and I do hereby declare that the following is a full, clear, and exact description of the same, reference being had to the annexed drawings, making a part of this specification, and to the letters and figures of reference marked thereon.

This invention relates to certain new and useful improvements in grain-drills, and is designed more particularly as an improvement on the device shown in my patent, No. 355,716, dated January 11, 1887. Heretofore it has been customary to attach the front end of the seat-support to some part of the front frame, not at or near to a point on a line with the hinged center point or points where the front and rear frames are pivoted together. This arrangement caused an oscillating motion of the seat beam or support and required that the rear upright support for the seat should be pivoted at both ends. Whenever the operator raises and lowers the front frame, the same motion causes the driver's seat and lever to have an oscillating motion. I dispense with this by the improved construction. In order to render it practicable for the operator to lift the front frame with the hopper and runners clear of the ground on a large machine, I extend the main beam of the front frame to the rear of the axles, and in order to insure that the wheels shall follow directly behind the runners I have devised a novel construction and connection between the wheel-frames. In constructing the open-heel runner the usual way is to let the shank only extend about one-half of the width of the runner down into the same. For two reasons I extend that part of the shank to rear or at the bottom of the runner, leaving just enough space at the rear of the same to have a free and unobstructed passage of the grain to the bottom of the opening. By this construction I use the lower end of the shank to press the ground upon which the grain falls. This is important, as the more the ground is pressed or packed on and underneath and about the seeded grain the better and quicker the seed germinates and the more roots it gets. I also by this means provide a runner that can be used advantageously in muddy or sticky ground.

The novelty in this present instance resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 2:
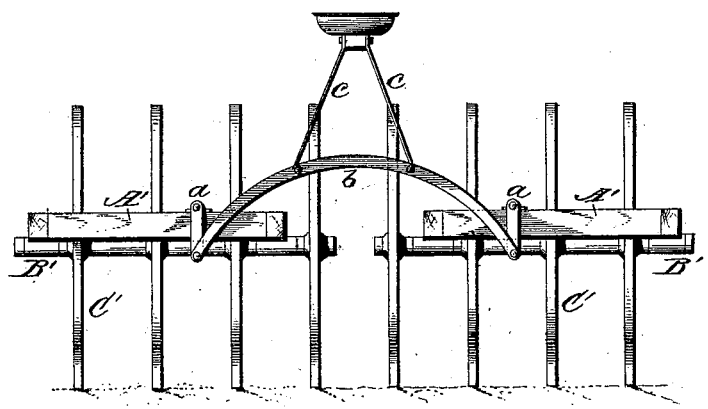

Figure 1 is a side elevation of a grain-drill provided with my improvements. Fig. 2 is a rear elevation of the same with parts removed. Fig. 3 is a top plan view, and Fig. 4 is an enlarged detail view in perspective of one of the runners, showing a portion thereof broken away.

The device embodies the usual front frame, A, carrying the hopper or seed-box B, and the runners C, the rear frames A', the axles B', and the wheels C', all of which generally may be of any well-known or preferred construction, except as hereinafter specified. The rear frames are suitably supported on the axles and at their front ends are pivoted to the hopper or front frame, as in the former patent above referred to. To the rear bars of the rear frames are attached by suitable means the rock-arms $a$, the free ends of which are pivoted to the connecting-bar $b$, the said bar serving as a distributing-bar, and by this connection the wheels on each frame are free to adjust themselves vertically or laterally and the bottom of the wheels to still follow the runner-track without affecting those on the other frame, as will be readily understood.

In my patent hereinbefore referred to, dated January 11, 1887, No. 355,716, I provide for secondary or distributing bars where three or more frames are used, the ends of the distributing-bar being pivoted to said secondary bars, and they in turn being pivoted to rear end of rear frames. I now pivotally attach the rock-arms $a$ at one end to the ends of the connecting or distributing bar and the other ends of said arms to the rear frames, for the purpose specified.

To the connecting or distributing bar are attached the seat support or supports c, to the upper ends of which is secured the rear end of the seat-beam D, the said beam extending for a short distance to the rear of its connection with the said uprights. The forward end of the seat-beam, instead of being attached to the bar of the front frame, is secured or pivoted on the same pivot on the front frame or seed-box that the front ends of the rear frames are pivoted. By this construction and connection of parts I dispense entirely with the oscillating motion of the seat above referred to, and the strain is taken from the rear frames in raising or lowering the runners.

The main beam E of the front frame is extended to the rear of the axles, as clearly shown in Fig. 1, for the purpose above stated. Attached to the rear end of the said main beam is one end of the bar d, to the other end of which is connected the short arm e, which carries the segmental rack f, with which engages the spring-actuated dog g on the lever F.

h and i are brace-bars attached to the seat-beam, as shown in Fig. 1.

In my runner, as seen more clearly in Fig. 4, that part of the boot or shank proper to conduct the grain down does not extend down inside the heel of the runner, it being only the piece of solid iron in front of where the grain falls to the ground, as shown at m, this extending to the bottom of the runner, thereby saving materially in the weight and cost thereof.

The novel features above enumerated combine to make the device a very efficient one for the purpose for which it is intended and adds to the durability and usefulness of the machine.

I do not desire to be restricted to any particular manner of pivoting the front and rear frames together, and the inside arms or bars may be pivoted to a sill of the front frame and on a line with the two outer side arms which are attached to the hopper.

What I claim as new is—

1. In a grain-drill, the combination, with the runner-frame, of the rear frames hinged thereto, the axles journaled in the hinged frames, the press-wheels mounted thereon, and the distributing-bar pivotally connected at its opposite ends to the rock-arms, said arms being pivoted to the ends of the rear frames, substantially as and for the purpose specified.

2. In a grain-drill, the combination, with the front frame and the rear frames hinged thereto, of the rock-arms on said rear frames and the distributing-bar for the seat-support, having its ends pivotally connected to the free ends of said rock-arms, substantially as and for the purpose specified.

3. In a grain-drill, the combination, with the front frame and the rear frames hinged thereto, of the seat-beam pivoted to the seed-box on the pivot of the rear frames, substantially as shown and described.

4. In a grain-drill, the combination, with the front frame and the rear frames hinged thereto, of the seat-beam pivoted on the pivot of the rear frames and the rigid seat-supports connected to the seat-beam near its rear end and to the rear frames, substantially as described.

5. A runner for grain-drills, having the front portion only of its shank extended to the bottom of the runner, substantially as and for the purpose specified.

6. In a grain-drill, the combination, with the axles and wheels, of the front frame having its main beam extended to the rear of said axles, substantially as and for the purpose specified.

In testimony that I claim the above I have hereunto subscribed my name in the presence of two witnesses.

JNO. W. RHODES.

Witnesses:
W. C. PURDY,
ISAAC N. MITCHELL.